US005576967A

United States Patent [19]

Grabner

[11] Patent Number: 5,576,967

[45] Date of Patent: Nov. 19, 1996

[54] METHOD AND APPARATUS FOR MONITORING AND ENSURING PRODUCT QUALITY

[75] Inventor: Alexander Grabner, Reutlingen, Germany

[73] Assignee: Institut Dr. Friedrich Forster Prufgeratebau GmbH & Co. KG, Reutlingen, Germany

[21] Appl. No.: 175,110

[22] Filed: Dec. 29, 1993

[51] Int. Cl.$^{6}$ .......... G06F 19/00

[52] U.S. Cl. .......... 364/469.01; 364/552; 364/554; 364/472.01

[58] Field of Search .......... 364/468, 550, 364/551.01, 552, 554, 507, 469, 472, 575

[56] References Cited

U.S. PATENT DOCUMENTS

| | | | |
|---|---|---|---|
| 3,648,035 | 3/1972 | Hart et al. | 364/469 X |
| 3,952,185 | 4/1976 | Stultz et al. | 364/552 X |
| 4,045,659 | 8/1977 | Akagawa et al. | 364/554 |
| 4,213,183 | 7/1980 | Barron et al. | 364/552 X |
| 4,354,177 | 10/1982 | Sloane | 364/553 X |
| 4,495,587 | 1/1985 | Plante et al. | 364/552 X |
| 4,591,041 | 5/1985 | Fant et al. | 364/552 |
| 4,774,682 | 9/1988 | White | 364/554 |
| 4,855,923 | 8/1989 | Fullmer | 364/554 X |
| 5,195,046 | 3/1993 | Gerardi et al. | 364/550 X |

FOREIGN PATENT DOCUMENTS

| | | |
|---|---|---|
| 2652015 | 3/1991 | France . |
| 2514616 | 4/1976 | Germany . |
| 2600023 | 7/1976 | Germany . |
| 2904951 | 5/1981 | Germany . |
| 2950869 | 6/1981 | Germany . |
| 3029337 | 3/1982 | Germany . |
| 3431609 | 3/1985 | Germany . |
| 4100500 | 7/1992 | Germany . |
| 1419785 | 8/1988 | U.S.S.R. . |

OTHER PUBLICATIONS

"*Mikrorechnergesteuertes Statistik–Auswertegerät*"; Dr.-Ing. W. Schönberger et al; May 1979, vol. 5, pp. 373–376.

*Primary Examiner*—Joseph Ruggiero
*Attorney, Agent, or Firm*—Bell, Seltzer, Park & Gibson, P.A.

[57] ABSTRACT

In a quality monitoring method it is proposed that in continuous operation a test signal be generated, digitized, logarithmized, followed by the calculation of a frequency distribution of the test signal amplitude. The frequency distribution can then be integrated in individual areas, the result for each area forming a feature of the test signal. The features of a test signal are combined into vectors, which can be used for a better evaluation of the quality of the production plant.

21 Claims, 4 Drawing Sheets

METHOD AND APPARATUS FOR MONITORING AND ENSURING PRODUCT QUALITY

BACKGROUND OF THE INVENTION

The invention relates to a method and an apparatus for monitoring the product quality of a production plant.

It is known to continuously monitor in non-destructive manner articles produced by a production plant. Use is made of eddy current, stray flux, ultrasonic, X-ray and other physical operating principles. Normally the testing systems generate analog test signals, which are displayed on monitors, so that the product quality can be read off. Normally a threshold value is given and on passing above or below the latter an alarm or some other fault indication is produced. Frequently the number of times limit values are exceeded are counted and used as a quality or fault measure. However, such known methods can only take account of whether or not a threshold value is exceeded. Thus, account cannot be taken of smaller signals which are below the fixed thresholds. Thus, no account is taken of part of the information content of the test signals. Thus, it is not possible to detect or follow e.g. a slow rise in the faults or defects prior to reaching the threshold value,. However, this behaviour would be of considerable significance if the aim is to describe future behaviour, e.g. state that shortly the production plant may operate defectively. For example it is not possible to recognize minor roughness differences of material surfaces or different chemical compositions only represented in the structure of the so-called parasitic signal.

An object of the invention is to provide a method of the aforementioned type, which permits a more sensitive and objective statement of the quality and changes to the quality of the product.

SUMMARY OF THE INVENTION

The above and other objects and advantages are achieved by the method and apparatus of the present invention which takes account of even the smallest signal amplitudes and their fluctuations, and which includes the steps of generating a continuous test signal which is representative of a quality parameter of the product, digitizing the test signal, determining a frequency distribution from the digitized test signal which indicates how often a specific value of the test signal occurs, and integrating the frequency distribution to derive a statistically relevant feature which describes the product quality.

By taking account of even the smallest signal amplitudes and their fluctuations, the invention permits a high sensitivity in quality testing and creates the possibility of objectively deriving from the statistics of the test signal numerical values as quality-describing characteristics, also known as features. These features in digital form make it possible to also time-follow the product quality and therefore establish changes to the latter in trend form. A statistical evaluation of the features is also possible. Through the presence of the features, there is an easy possibility of coupling to a computer, e.g. a master process computer. The results can be represented as a bar diagram or graph or in some other way on a monitor and optionally directly compared with an ideal vector.

As a further development the invention proposes that the amplitude frequency distribution is logarithmized prior to deriving the features. This permits a better stressing of the significance of events with limited frequencies, but which represent major faults or errors.

According to a further development the features can be determined by segmental integration of the amplitude frequency distribution. This integration can take place by sum formation over areas of the frequency distribution with specific limits. These limits can be fixed or also modified as a function of the nature of the plant, the monitoring problem and the desired accuracy.

According to the invention the amplitude distribution can be intermediately stored during the evaluation of the features. This permits a continuous display or indication, the picture on the screen being switched whenever a new evaluation takes place.

According to the invention, the determined feature vector can be displayed optically or graphically and in particular together with an ideal vector.

What has been hitherto indicated for the processing of a single test signal, can be performed in the same way for two or more test signals. A multiplexer can ensure that all the test signals are processed and displayed quasi-simultaneously.

As a further development, the invention also proposes that additionally at least one process signal representing the state of the production plant is determined and processed in the same way as the test signal. It is also conceivable to perform a method for the monitoring of the production plant exclusively with process signals, which are processed in a similar way to what has been described hereinbefore for the product signal.

According to a further development of the invention, the feature vector of the test signal and the feature vector of the process signal are statistically evaluated, checked and investigated for the presence of correlations. This makes it possible to seek common points in the feature vectors, in order to optionally directly find in this way the courses of error and eliminate them at an early stage.

The process signal can e.g. be constituted by vibrations, temperatures or current consumption values.

The invention also proposes that the feature vectors are stored and from a comparison details concerning a trend can be derived.

Thus, for example, according to the invention the mean value and the standard deviation for each feature can be determined and retained in connection with a specific lot or batch size. If the product whose quality is to be monitored is e.g. a metal sheet or plate, then the size or length of the plate is used as the batch size. As a result of the storage of these values, information directly associated with the plate exists concerning its quality and which is printed out in the form of a production report and can be supplied together with said plate to the customer. Thus, the plate recipient not only receives the information that the plate has the necessary quality, but also details of divergences from the desired value over the entire size of the plate.

According to a further development such a determination is performed over longer intervals in order to obtain information on the process capacity of the apparatus. These intervals can e.g. be large compared with the batch size.

For a particularly simple reading possibility, it can be provided that if the value of a feature exceeds a specific limit, the feature value represented on the screen as a bar can be differently displayed, e.g. by a change to the hatching or a grey shade for the bar, but in particular by a colour change to a striking colour. On dropping below the value again, there is a display change in the reverse direction.

The apparatus proposed by the invention is constructed in such a way that the aforementioned method steps can be performed.

Further features, details and advantages of the invention can be gathered from the claims, the following description of a preferred embodiment and the drawings. The embodiment describes the use of the method in monitoring the quality of the product of a wire rolling mill, the test signal e.g. being generated as an eddy current signal. However, this is only a possible and preferred use example, which can be modified within the scope of the invention with a view to different production plant types.

BRIEF DESCRIPTION OF THE DRAWINGS

Some of the objects and advantages of the present invention having been stated, others will appear from the following description when considered in conjunction with the accompanying drawings, in which.

DETAILED DESCRIPTION OF THE PREFERRED EMBODIMENT

Figure 1:
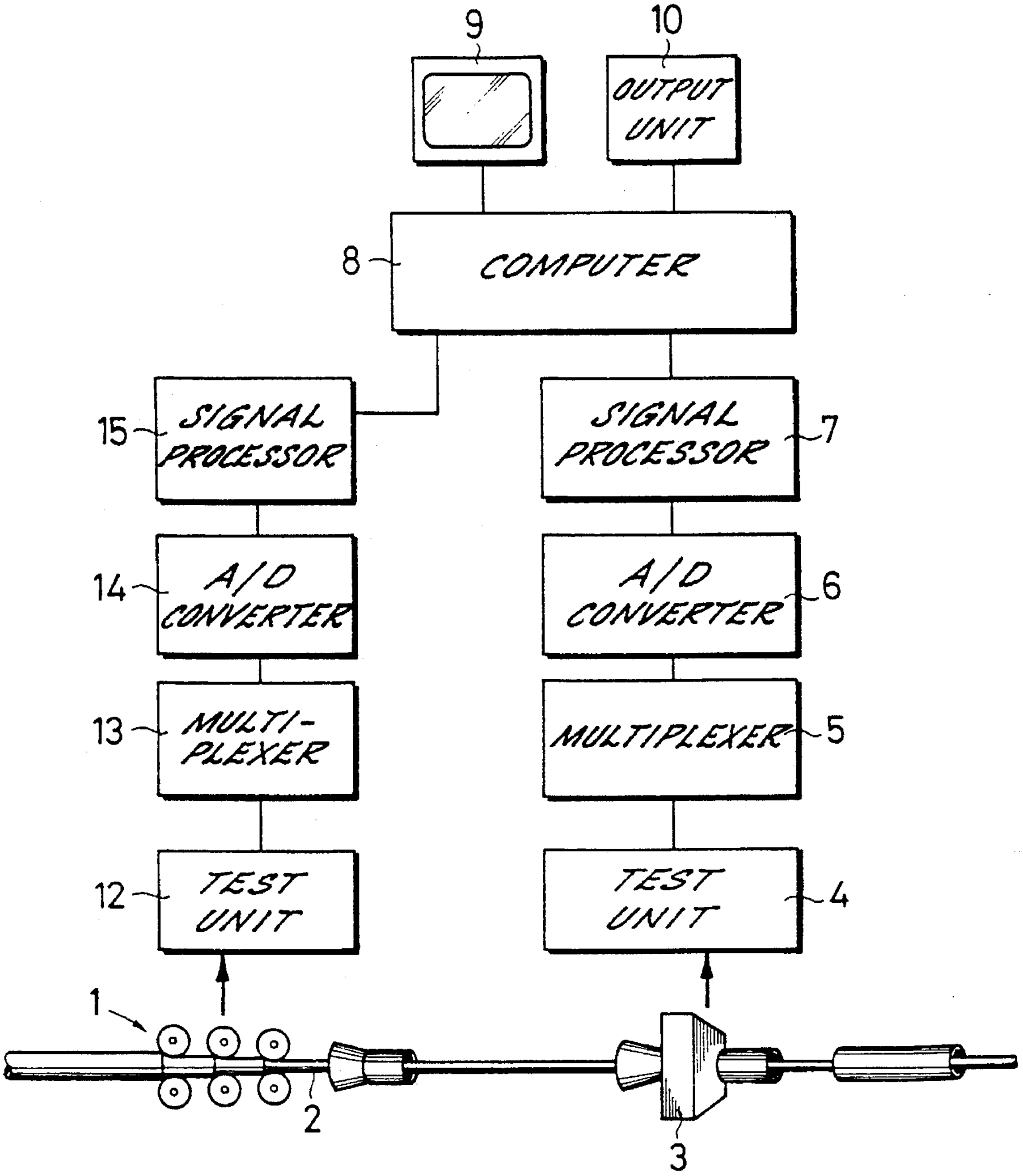
FIG. 1 A diagrammatic block circuit diagram of an apparatus for performing the method.

FIG. 1 shows in block circuit diagram form the use of the method on a wire rolling mill for the production of wire. The last part of this rolling mill is formed by a roll stand 1, which the wire 2 leaves. The wire 2 is then passed through an eddy current coil 3 and is subsequently cooled. In the eddy current coil 3 a test signal is produced on the basis of a measured eddy current and to said coil belongs the test unit 4. The generated test signal or signals occur in the form of an analog voltage signal. The said analog voltage signal is applied across a multiplexer unit 5 to an analog-digital converter 6, in which the signal is digitized. It then reaches a signal processor 7, which performs the evaluation and processing of the test signal. The signal processor is connected to a computer 8, which can be used for the control and performance of further processes. In particular, the computer contains a display unit 9 and a further output unit 10. On the screen 9 it is possible to display the test signal in the form proposed by the invention and in particular compared with a desired quality signal. It is obviously possible to ensure on the basis of a corresponding computer programming that also feature vectors of other test signals or miscellaneous statistical details can be displayed.

For further purposes it is also possible to ensure that the results are printed out, e.g. with the aid of the output unit 10.

Figure 2:
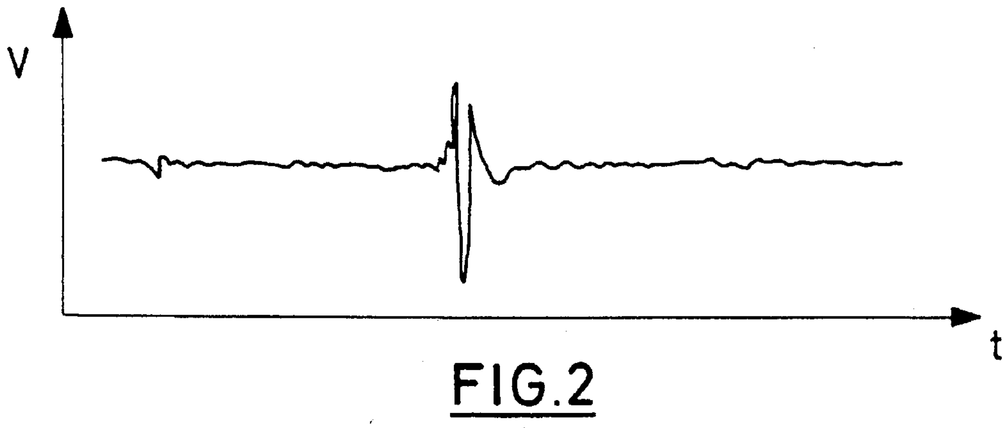
FIG. 2 The path of the test signal in time-extended scale.

FIG. 2 shows the path of the test signal as a voltage compared with time. The minor deviations compared With a recognizable normal line represent the faultless wire, whereas deflections to either side indicate faults.

Figure 3:
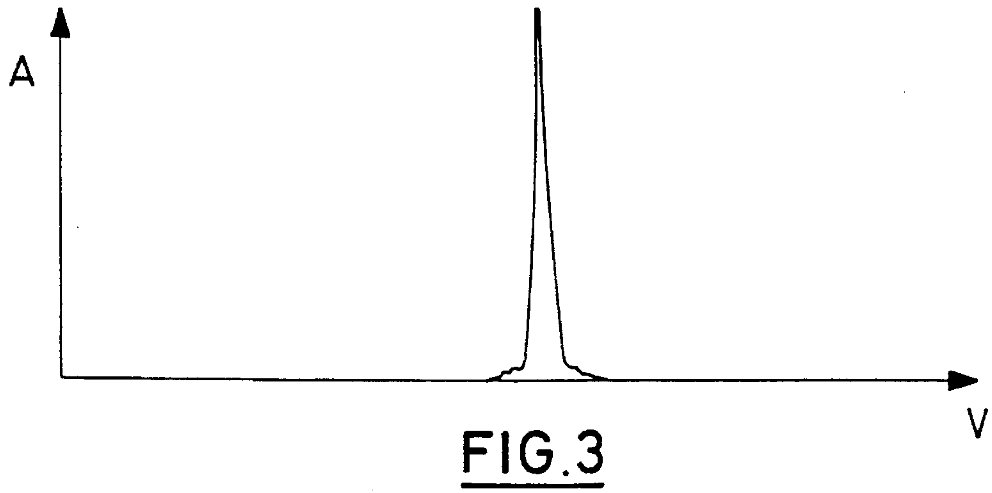
FIG. 3 The amplitude frequency distribution of the test signal.

FIG. 3 shows the frequency distribution determined by the signal processor 7, the test signal measured value being plotted on the abscissa, e.g. a voltage in volts, whilst the ordinate represents the number of amplitudes within the measurement time. As is to be expected, there is a sharp maximum of the frequency distribution at the value corresponding to the faultless wire. However, it can be seen that on either side of the steep fall there are local peaks, which can indicate the appearance of a fault. In order to be able to more clearly take account of these events, which rarely occur but indicate a fault, the signal processor forms the logarithm of the frequency distribution and this is shown in FIG. 4.

Figure 4:
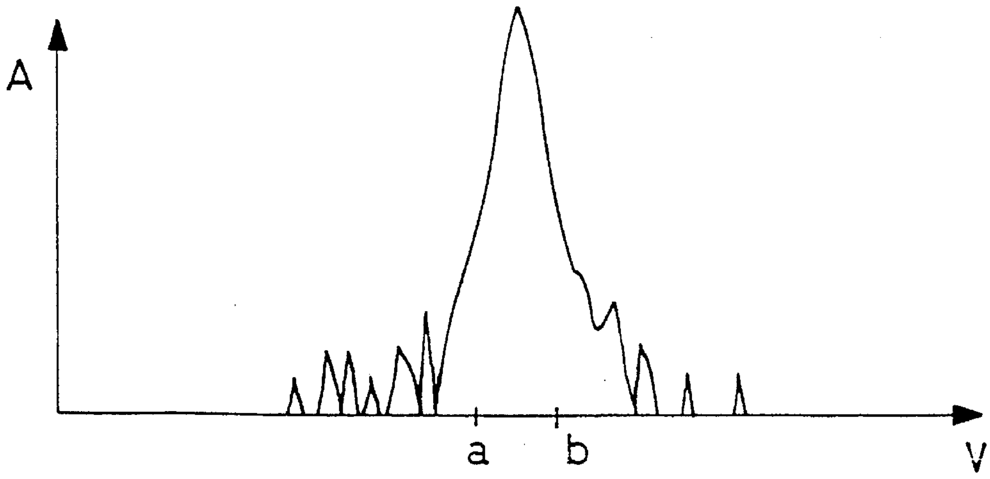
FIG. 4 The logarithmized amplitude frequency distribution of the test signal.
Figure 5:
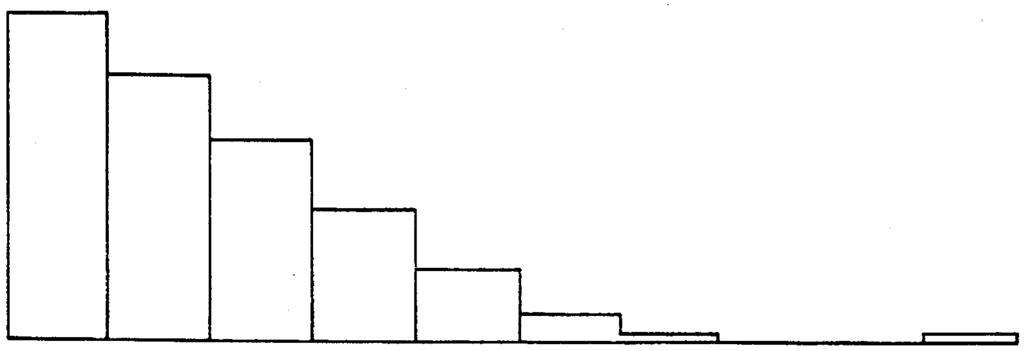
FIG. 5 The sum frequency values of the distribution over certain areas.
Figure 6:
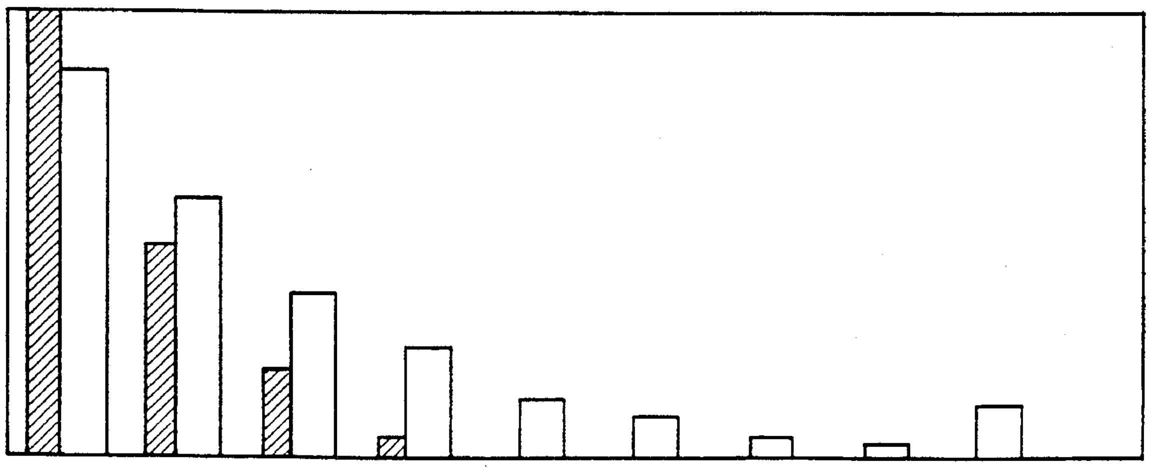
FIG. 6 A possible graphic representation of a feature vector compared with an ideal vector.

The voltage range is now broken down into individual ranges, e.g. a to b in FIG. 4. Over the said ranges there is in each case an integration of the frequency distribution and the resulting values, namely the frequency values within the ranges, are represented in FIG. 5. These values represented in FIG. 5 constitute the features of the test signal. By the choice of the size of the areas over which integration takes place, it is possible to define the number of features and therefore the accuracy. This can be performed as a function of the individual case and the requirements. The values corresponding to the amplitudes of the bars in FIG. 5 consequently represent the components of the feature vector. These features of in each case one vector can be represented on the display unit 9 of FIG. 1, e.g. as a bar graph, cf. FIG. 6. In FIG. 6 the somewhat wider bars left free represent the features of the vector of the test signal, whereas the narrower and hatched areas represent the features of an ideal vector. FIG. 6 could e.g. directly be the picture appearing on a monitor. In FIG. 6 the features to the right describe an error or fault.

Figure 7:
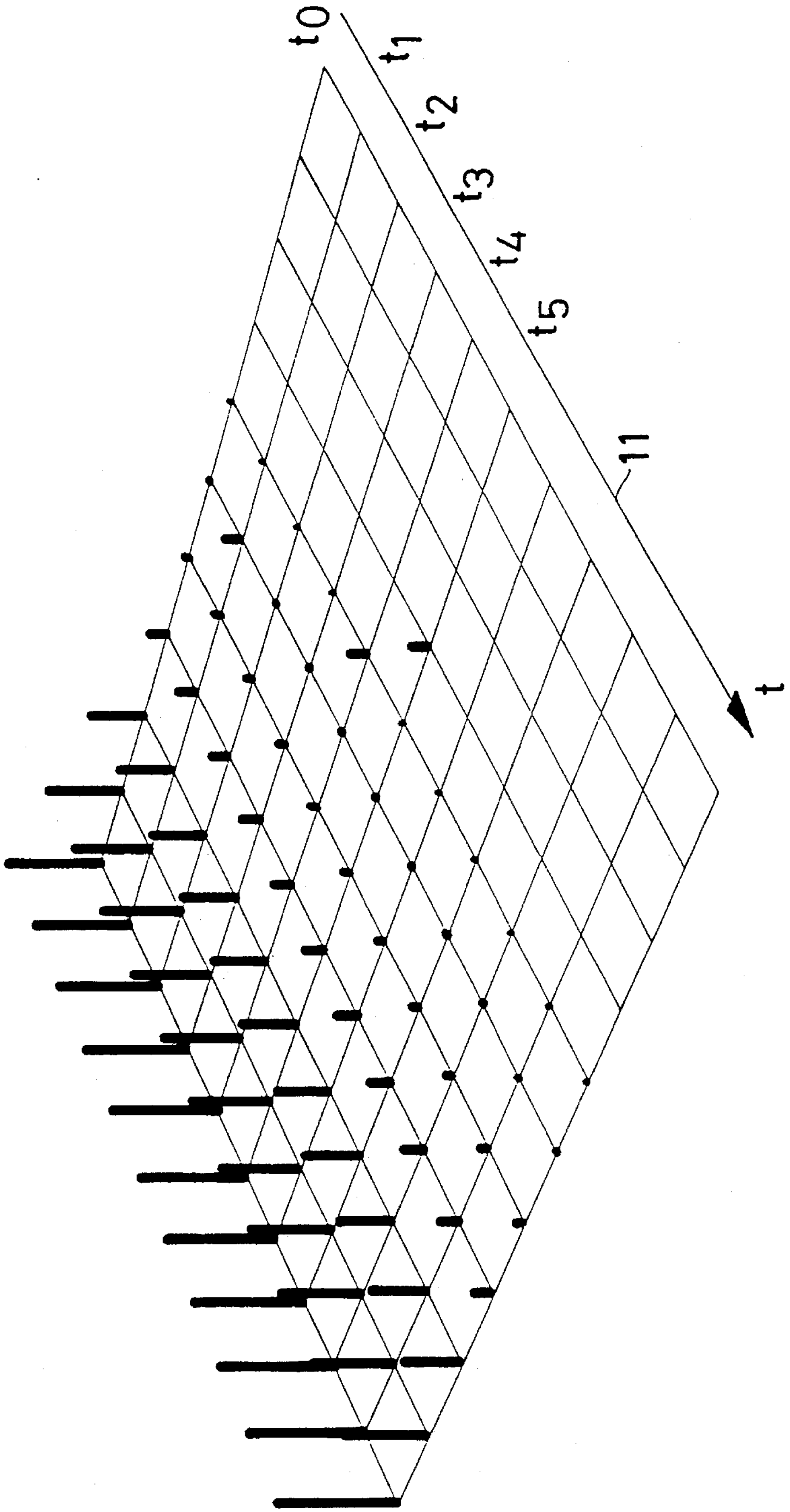
FIG. 7 A three-dimensional representation of the feature vectors over a certain time period.

The feature vectors are graphically represented with a certain time interval. On the basis of the presence of the features as numbers to store the feature vectors with limited effort and as a result indicate a trend. This is the aim of FIG. 7, where the arrow 11 to the right represents the positive time axis. Thus, individual feature vectors are represented continuously as bar graphs from the back to the front. It is clear at a glance that the feature vectors at time T1, T4 and T5 represent faults.

What has been represented and described relative to FIGS. 2 to 7 for the feature vectors of the test signal, can also be performed for process signals, i.e. for signals which can be derived from any random state of the production plant. This is diagrammatically shown in FIG. 1 by also representing a test unit 12 for the roll stand. This process signal is processed in the same way and with similar devices 13 to 15 and supplied to the computer 8. If over a certain time feature vectors of process signals are also stored and statistically evaluated, then the signals can be investigated for a correlation between process signals and test signals. In this way it is possible to investigate which process signals and test signals are linked enabling conclusions to be drawn concerning a possible causal connection.

As a result of the presence of feature vectors in digitized form, it is possible to perform statistical evaluations of the most varied types. Through the determination and recording of mean values and standard deviations of all the features for a specific batch size, selected as a function of the workpiece, information can be obtained on the quality of the workpiece, extending well beyond answering the question as to whether or not the quality is adequate. The purchaser of a workpiece, e.g. a plate having a specific size, can be provided with a quality report, from which he can gather the quality at any point on the plate. By averaging and calculations of standard deviations over longer time periods, information can be gathered on the process capacity of the manufacturing plant, i.e., information as to whether the production plant is able to fulfill the product quality requirements. Thus, bases can be determined as to whether and optionally also which correction measures have to be carried out on the production plant, so that as a final result a top quality product is guaranteed.

I claim:

1. A method of monitoring the product quality of a continuously produced product and comprising the steps of generating a continuous test signal which is representative of a quality parameter of the product, digitizing the test signal, determining a frequency distribution from the digitized test signal, which indicates how often a specific value of the test signal occurs, and integrating the frequency distribution in segments of the frequency distribution to derive a statistically relevant feature which describes the product quality.

2. The method as defined in claim 1 comprising the further step of comparing the derived statistically relevant feature with an ideal value thereof.

3. The method as defined in claim 2 comprising the further step of displaying both the derived statistically relevant feature and the ideal value thereof.

4. The method as defined in claim 1 comprising a further step of logarithmizing the amplitude of the frequency distribution prior to the integrating step.

5. The method as defined in claim 4 wherein the logarithmizing step includes the summation over areas of frequency distribution with specific limits.

6. The method as defined in claim 1 comprising the further step of temporarily storing the values of the test signal.

7. The method as defined in claim 1 wherein the step of generating a continuous test signal includes generating a plurality of such test signals representing respective quality parameters of the product, with each of the test signals being subjected to the digitizing, determining, and integrating steps.

8. The method as defined in claim 1 comprising the further steps of determining the mean value and standard deviation of the derived statistically relevant feature.

9. The method as defined in claim 1 wherein the integrating step includes segmental integration of the amplitude of the frequency distribution.

10. An apparatus for monitoring the product quality of a continuously produced product and comprising a test unit for generating a continuous test signal which is representative of a quality parameter of the product, a signal processor for digitizing the test signal, determining a frequency distribution from the digitized test signal which indicates how often a specific value of the test signal occurs, and integrating the frequency distribution in segments of the frequency distribution to derive a statistically relevant feature which describes the product quality.

11. The apparatus as defined in claim 10 wherein the signal processor includes an analog-digital converter, a multiplexer, a logarithmizing circuit, an evaluation device, and a display device for the derived statistically relevant feature.

12. The apparatus as defined in claim 10 wherein the signal processor includes at least two memory units for storing the test signal and the amplitude of the frequency distribution.

13. A method of monitoring the product quality of a continuously produced product and comprising the steps of generating a continuous test signal which is representative of a quality parameter of the product, digitizing the test signal, determining a frequency distribution from the digitized test signal, which indicates how often a specific value of the test signal occurs, integrating the frequency distribution to derive a statistically relevant feature which describes the product quality, and comparing the derived statistically relevant feature with an ideal value thereof.

14. The method as defined in claim 13 comprising the further step of displaying both the derived statistically relevant feature and the ideal value thereof.

15. A method of monitoring the product quality of a continuously produced product and comprising the steps of generating a continuous test signal which is representative of a quality parameter of the product, digitizing the test signal, determining a frequency distribution from the digitized test signal, which indicates how often a specific value of the test signal occurs, integrating the frequency distribution to derive a statistically relevant feature which describes the product quality, and logarithmizing the amplitude of the frequency distribution prior to the integrating step.

16. The method as defined in claim 15 wherein the logarithmizing step includes the summation over areas of frequency distribution with specific limits.

17. A method of monitoring the product quality of a continuously produced product and comprising the steps of generating a continuous test signal which is representative of a quality parameter of the product, digitizing the test signal, determining a frequency distribution from the digitized test signal, which indicates how often a specific value of the test signal occurs, integrating the frequency distribution to derive a statistically relevant feature which describes the product quality, and temporarily storing the values of the test signal.

18. A method of monitoring the product quality of a continuously produced product and comprising the steps of generating a continuous test signal which is representative of a quality parameter of the product, digitizing the test signal, determining a frequency distribution from the digitized test signal, which indicates how often a specific value of the test signal occurs, integrating the frequency distribution to derive a statistically relevant feature which describes the product quality, and wherein the step of generating a continuous test signal includes generating a plurality of such test signals representing respective quality parameters of the product, with each of the test signals being subjected to the digitizing, determining, and integrating steps.

19. A method of monitoring the product quality of a continuously produced product and comprising the steps of generating a continuous test signal which is representative of a quality parameter of the product, digitizing the test signal, determining a frequency distribution from the digitized test signal, which indicates how often a specific value of the test signal occurs, integrating the frequency distribution to derive a statistically relevant feature which describes the product quality, and determining the mean value and standard deviation of the derived statistically relevant feature.

20. An apparatus for monitoring the product quality of a continuously produced product and comprising a test unit for generating a continuous test signal which is representative of a quality parameter of the product, a signal processor for digitizing the test signal, determining a frequency distribution from the digitized test signal which indicates how often a specific value of the test signal occurs, and integrating the frequency distribution to derive a statistically relevant feature which describes the product quality, said signal processor including an analog-digital converter, a multiplexer, a logarithmizing circuit, an evaluation device, and a display device for the derived statistically relevant feature.

21. An apparatus for monitoring the product quality of a continuously produced product and comprising a test unit for generating a continuous test signal which is representative of a quality parameter of the product, a signal processor for digitizing the test signal, determining a frequency distribution from the digitized test signal which indicates how often a specific value of the test signal occurs, and integrating the frequency distribution to derive a statistically relevant feature which describes the product quality, said signal processor including at least two memory units for storing the test signal and the amplitude of the frequency distribution.

* * * * *